United States Patent
Arakane

(10) Patent No.: US 8,312,386 B2
(45) Date of Patent: Nov. 13, 2012

(54) DISPLAY DEVICE CAPABLE OF SCROLLING NAVIGATION STRING OF CURRENT DISPLAY

(75) Inventor: Satoru Arakane, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 287 days.

(21) Appl. No.: 12/727,376

(22) Filed: Mar. 19, 2010

(65) Prior Publication Data

US 2010/0275151 A1      Oct. 28, 2010

(30) Foreign Application Priority Data

Apr. 28, 2009   (JP) .................................. 2009-109009

(51) Int. Cl.
*G06F 3/048* (2006.01)

(52) U.S. Cl. ........ 715/784; 715/783; 715/785; 715/786; 715/787

(58) Field of Classification Search .................. 715/823, 715/854, 783–787
See application file for complete search history.

(56) References Cited

U.S. PATENT DOCUMENTS

| | | | | |
|---|---|---|---|---|
| 2003/0197738 A1* | 10/2003 | Beit-Zuri et al. | ............. | 345/786 |
| 2004/0207666 A1* | 10/2004 | Hally et al. | .................... | 345/854 |
| 2006/0136832 A1* | 6/2006 | Keller et al. | .................. | 715/765 |
| 2007/0173327 A1* | 7/2007 | Kilgore et al. | .................. | 463/42 |

FOREIGN PATENT DOCUMENTS

| | | |
|---|---|---|
| JP | 9-269883 | 10/1997 |
| JP | 2006-236142 A | 9/2006 |

* cited by examiner

*Primary Examiner* — Omar Abdul-Ali
*Assistant Examiner* — Sherrod Keaton
(74) *Attorney, Agent, or Firm* — Scully, Scott, Murphy & Presser, PC

(57) ABSTRACT

A display device includes a display unit, a first display control unit, a title string storing unit, a navigation string creating unit, a second display control unit, and a scrolling unit. The display unit includes a first portion and a second portion. The first display control unit is configured to display one of a plurality of screen images on the first portion. The plurality of screen images includes a base screen image and being arranged hierarchically from the base screen image. The first display control unit changes a screen image to display from one to another of the plurality of screen images along a screen navigation path starting from the base screen image based on screen navigation data, the screen navigation data indicating relationships between the screen images. The title string storing unit is configured to store a plurality of title strings, each title string indicating one of the plurality of screen images. The navigation string creating unit is configured to create a navigation string including the title strings each corresponding to a screen image which is positioned in a part of the screen navigation path from the base screen image to a current screen image that is displayed on the first portion currently. The second display control unit is configured to display the navigation string on the second portion. The scrolling unit is configured to scroll the navigation string on the second portion in a longitudinal direction of the navigation string so that a part of the navigation string is displayed on the second portion at a time.

11 Claims, 9 Drawing Sheets

FIG.2

| HIERARCHICAL LEVEL | 1 | | 2 | | 3 | | 4 | | 5 | |
|---|---|---|---|---|---|---|---|---|---|---|
| TITLE / ID | MENU | ID00 | GENERAL SETUP | ID100 | MODE TIMER | ID101 | | | | |
| | | | | | PAPER TYPE | ID102 | | | | |
| | | | | | PAPER SIZE | ID103 | | | | |
| | | | FAX | ID200 | SETUP RECEIVE | ID201 | RING DELAY | ID204 | | |
| | | | | | | | FAX PREVIEW | ID205 | | |
| | | | | | PRINT FAX | ID202 | | | | |
| | | | | | SETUP MSG CTR | ID203 | OGM | ID206 | MSG CTR OGM | ID209 |
| | | | | | | | | | F/T OGM | ID210 |
| | | | | | | | ICM MAX. TIME | ID207 | | |
| | | | | | | | ICM REC. MONITOR | ID208 | | |
| | | | NETWORK | ID300 | WIRED LAN | ID301 | TCP/IP | ID304 | IP ADDRESS | ID306 |
| | | | | | | | | | SUBNET MASK | ID307 |
| | | | | | | | | | GATEWAY | ID308 |
| | | | | | WLAN | ID302 | SSID | ID305 | <NEW SSID> | ID309 |
| | | | | | FACTORY RESET | ID303 | | | | |

DISPLAY DEVICE CAPABLE OF SCROLLING NAVIGATION STRING OF CURRENT DISPLAY

CROSS REFERENCE TO RELATED APPLICATION

This application claims priority from Japanese Patent Application No. 2009-109009 filed Apr. 28, 2009. The entire content of the priority application is incorporated herein by reference.

TECHNICAL FIELD

The present invention relates to a display device.

BACKGROUND

A multifunction peripheral is well known in the art as a single device capable of implementing a plurality of functions, such as a facsimile function, printer function, scanner function, and copier function. The multifunction peripheral allows a user to modify various setting items, such as resolution, density, and zoom percentage. The user can execute a desired operation on the multifunction peripheral after modifying the setting values as desired.

For example, the user may follow the procedure below to modify setting values for the multifunction peripheral. First, the multifunction peripheral displays a setup menu screen in a display panel provided on the multifunction peripheral. The menu screen includes various choices for each function of the multifunction peripheral, such as facsimile setup and scanner setup, as well as a general setup selection. When the user selects one of the choices listed in the menu, the multifunction peripheral changes the display on the display panel to a list of setting items related to the selected function.

When the user selects one of the setting items from the displayed list, the multifunction peripheral changes the display on the display panel to a modification screen in which the user can modify the value assigned to the setting item. While the modification screen is displayed, the user may input or modify the value assigned to the setting item as desired.

As the user performs operations to navigate through the prepared screens in this way, data indicating the path that the user has taken to arrive at the current screen may also be displayed in the display panel together with the current screen. One conventional format for displaying this path is called "breadcrumbs."

Breadcrumbs (or "breadcrumb trail") is a format for displaying the name of each screen that the user has navigated through to arrive at the current screen in the order displayed, such as in the example "Menu screen>Facsimile setup>Resolution." Through the breadcrumbs displayed with each screen, the user can determine to which function and to which setting item the current screen is related.

SUMMARY

However, in many cases the multifunction peripheral is provided with a liquid crystal display or the like having a limited display area. Therefore, when the character string constituting the breadcrumbs becomes long, it is impossible to display the entire text from beginning to end and, thus, the multifunction peripheral cannot adequately present this information to the user.

In view of the foregoing, it is an object of the present invention to provide a display device capable of displaying useful information by which the user can understand the hierarchical level to which the currently displayed data belongs.

In order to attain the above and other objects, the invention provides a display device including a display unit, a first display control unit, a title string storing unit, a navigation string creating unit, a second display control unit, and a scrolling unit. The display unit includes a first portion and a second portion. The first display control unit is configured to display one of a plurality of screen images on the first portion. The plurality of screen images includes a base screen image and being arranged hierarchically from the base screen image. The first display control unit changes a screen image to display from one to another of the plurality of screen images along a screen navigation path starting from the base screen image based on screen navigation data. The screen navigation data indicates relationships between the screen images. The title string storing unit is configured to store a plurality of title strings, each title string indicating one of the plurality of screen images. The navigation string creating unit is configured to create a navigation string including the title strings each corresponding to a screen image which is positioned in a part of the screen navigation path from the base screen image to a current screen image that is displayed on the first portion currently. The second display control unit is configured to display the navigation string on the second portion. The scrolling unit is configured to scroll the navigation string on the second portion in a longitudinal direction of the navigation string so that a part of the navigation string is displayed on the second portion at a time.

According to another aspect, the present invention provides a method including: displaying one of a plurality of screen images on a first portion of a display unit, the plurality of screen images including a base screen image and being arranged hierarchically from the base screen image, the display unit including the first portion and a second portion; changing a screen image to display from one to another of the plurality of screen images along a screen navigation path starting from the base screen image based on screen navigation data, the screen navigation data indicating relationships between the screen images; creating a navigation string including title strings each corresponding to a screen image which is positioned in a part of the screen navigation path from the base screen image to a current screen image that is displayed on the first portion currently, each title string indicating one of the plurality of screen images; displaying the navigation string on the second portion; and scrolling the navigation string on the second portion in a longitudinal direction of the navigation string so that a part of the navigation string is displayed on the second portion at a time.

According to another aspect, the present invention provides a computer-readable recording medium that stores a data processing program. The data processing program includes instructions for: displaying one of a plurality of screen images on a first portion of a display unit, the plurality of screen images including a base screen image and being arranged hierarchically from the base screen image, the display unit including the first portion and a second portion; changing a screen image to display from one to another of the plurality of screen images along a screen navigation path starting from the base screen image based on screen navigation data, the screen navigation data indicating relationships between the screen images; creating a navigation string including title strings each corresponding to a screen image which is positioned in a part of the screen navigation path from the base screen image to a current screen image that is displayed on the first portion currently, each title string indicating one of the plurality of screen images; displaying the navigation string on the second portion; and scrolling the navigation string on the second portion in a longitudinal direction of the navigation string so that a part of the navigation string is displayed on the second portion at a time.

BRIEF DESCRIPTION OF THE DRAWINGS

The particular features and advantages of the invention as well as other objects will become apparent from the following description taken in connection with the accompanying drawings, in which:

FIG. 2 is an explanatory diagram showing a configuration of screen management table stored in the display device;

DETAILED DESCRIPTION

Figure 1:
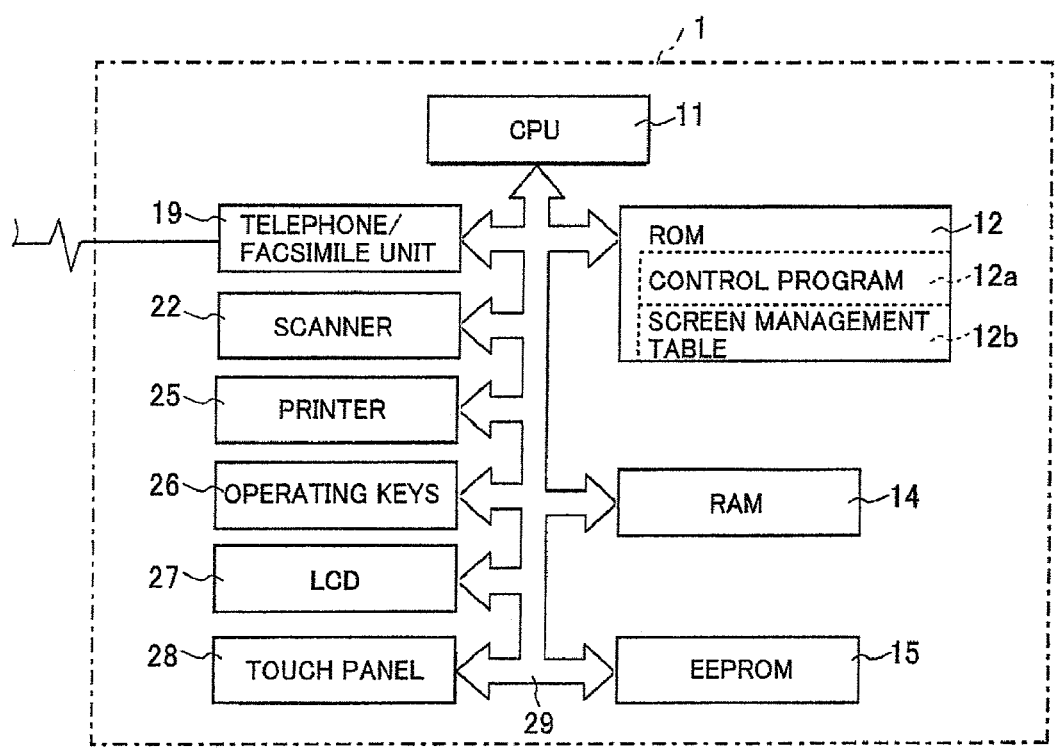
FIG. 1 is a block diagram showing an electrical structure of a display device according to a first embodiment of the invention.

Next, a multifunction peripheral 1 according to a first embodiment of the present invention will be described while referring to FIGS. 1 through 7 wherein like parts and components are designated by the same reference numerals to avoid duplicating description.

The MFP 1 is a multifunction peripheral having multiple functions, including a facsimile function and a printer function. The MFP 1 also allows the user to modify various setting items defining operating conditions and the like for each function. In addition, the MFP 1 has a plurality of setup screens by which the user can modify values for each setting item. The MFP 1 organizes and manages the setup screens in hierarchical levels and displays the screens on a liquid crystal display (LCD) 27 in response to user operations. As will be described later in greater detail, the MFP 1 can display breadcrumbs 35b (see FIG. 3) in the form of a character string on the LCD 27 by which the user can determine the hierarchical level for the currently displayed setup screen.

The MFP 1 is provided with a CPU 11, a ROM 12, a RAM 14, an EEPROM 15, a telephone/fax unit 19, a scanner 22, a printer 25, operating keys 26, the LCD 27, and a touch panel 28 all of which components are interconnected via a bus line 29. The MFP 1 includes other components, such as an interface for connecting to a personal computer or LAN, but these components are not shown in the drawings and will not be described herein.

The CPU 11 of the MFP 1 serves to control the various functions of the MFP 1 based on fixed values and programs stored in the ROM 12 and RAM 13. The ROM 12 is a non-rewritable memory storing control programs and the like executed on the MFP 1. The ROM 12 stores a control program 12a and a screen management table 12b.

The RAM 14 is a memory for temporarily storing various data. The EEPROM 15 is a nonvolatile rewritable memory for storing various data indicating setting contents for each setting items and fixed values. The telephone/facsimile unit is connected to external devices via a network 30 such as telephone lines, interne service, and the like.

The LCD 27 has an LCD panel (not shown). The MFP 1 displays prepared setup screens in the LCD panel of the LCD 27 as needed. These setup screens will be described later with reference to FIG. 3. The touch panel 28 is a type of input device and is disposed parallel and in proximity to the display surface of the LCD panel. When the user touches the display surface of the LCD panel with a finger or the like, the touch panel 28 detects the position of the finger with respect to the LCD panel.

The MFP 1 is configured to switch one of a printing mode, a facsimile mode, and a setting mode based on operations of the operating keys 26. In the printing mode, the MFP 1 can perform a printing operation. In the facsimile mode, the MFP 1 can perform a transmitting to/receiving for facsimiles. In the setting mode, the MFP 1 can change the setting contents for each setting items.

As shown in FIG. 2, the screen management table 12b defines the hierarchical level, screen title, and title ID for each of the prepared screens that can be displayed in an LCD panel of the LCD 27. The MFP 1 manages a plurality of setup screens in accordance to the screen management table 12b. The setup screens are arranged hierarchically from a menu screen (base screen image). The screen management table 12b indicates relationships between the setup screens.

The hierarchical level is a value indicating the hierarchical position to which each setup screen belongs. In the example shown in FIG. 2, each of the setup screens belongs to one of first through fifth levels, where a smaller level number represents a higher hierarchical level. The screen title is configured of a descriptive character string by which the content of the setup screen can be discerned. One screen is stored in the screen management table 12b in association with each setup screen indicating one setup screen. The title ID is a resource ID in the form of a character string. One unique title ID is assigned to each screen title and is used to create the breadcrumbs, as will be described later.

As shown in FIG. 2, the menu screen having the screen title "Menu" is defined in the screen management table 12b as a setup screen in the first level (hierarchical level 1). Setup screens defined for the second level (hierarchical level 2) directly beneath the first level are a general setup screen having the screen title "General Setup," a facsimile setup screen having the screen title "Fax," and a network setup screen having the screen title "Network." Similarly, the screen management table 12b defines setup screens belonging to the third level (hierarchical level 3) directly beneath the second level, setup screens belonging to the fourth level (hierarchical level 4) positioned directly beneath the third level, and setup screens belonging to the fifth level (hierarchical level 5) positioned directly beneath the fourth level.

The MFP 1 transitions between screens from the top hierarchical level to each lower level in sequence. For example, in order to display a TCP/IP setup screen (having the screen title "TCP/IP") belonging to the fourth level, the MFP 1 first displays the menu screen of the first level, then displays the network setup screen of the second level, then displays the LAN setup screen (having the screen title "Wired LAN") of the third level, and finally displays the TCP/IP setup screen of the fourth level.

Figure 3:
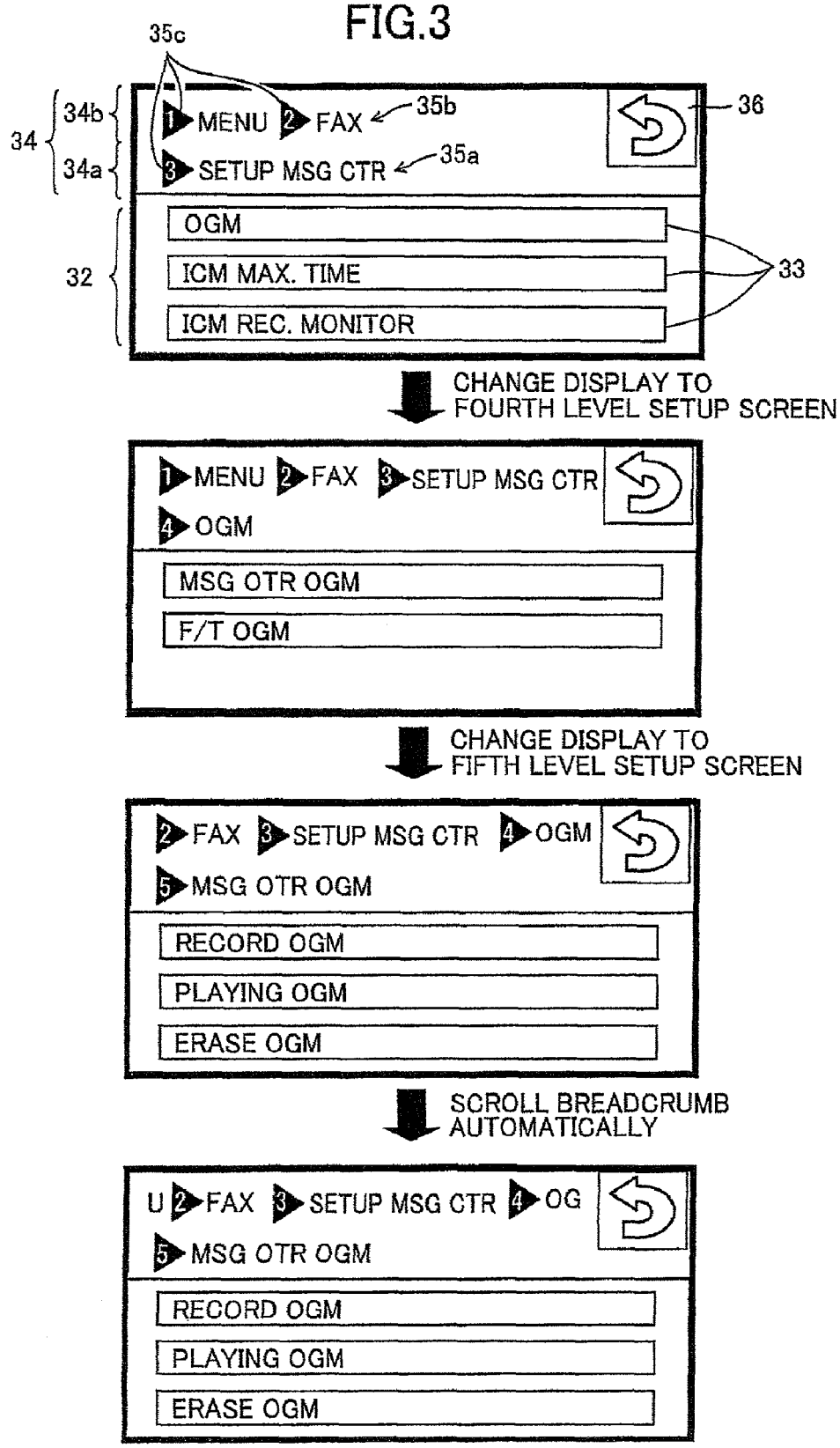
FIG. 3 is an explanatory diagram showing a transition of screen images displayed on a display unit provided on the display device.

Here, the screens displayed on the LCD 27 will be described with reference to FIG. 3. FIG. 3 shows screen images illustrating a sample transition of screens displayed on the LCD 27. As shown in FIG. 3, the display area of the LCD panel is configured of a selection display area 32, a screen description area 34, and a Return button area 36.

A setup screen is displayed in the selection display area 32. The setup screen includes various selections 33 that may be selected when operated by the user. Each selection 33 is a graphic image that includes the screen title of a setup screen positioned one level below the currently displayed setup screen and functions as a button by which the user can select this lower level setup screen. The top screen image in FIG. 3 shows an example of a third level setup screen having the screen title "Setup Msg Ctr" displayed in the selection display area 32. Within the selections 33 included in this setup screen, the MFP 1 adds screen titles for setup screens belonging to the level directly below the currently displayed setup screen (i.e., the fourth level).

The screen description area 34 includes a title display area 34a occupying the lower half thereof, and a breadcrumbs display area 34b occupying the upper half thereof. The title display area 34a is provided for displaying a screen title 35a for the setup screen currently displayed on the selection display area 32. A triangular separating character 35c is also displayed in the title display area 34a at the head of the screen title 35a. The separating character 35c includes a number that indicates the level number (hierarchical order) of the current setup screen. Based on the number included in the separating character 35c, the user can determine the hierarchical level to which the currently displayed setup screen belongs. For example, the top image of FIG. 3 indicates that the currently displayed setup screen belongs to the third level.

The breadcrumbs display area 34b serves to display the breadcrumbs 35b. The breadcrumbs 35b are a character string formed by arranging the screen title corresponding to each setup screen that has been displayed up to the currently displayed setup screen in a single horizontal line in order of hierarchical level. In the example shown in the top image of FIG. 3, a character string formed by concatenating all screen titles displayed up to, but not including, the currently displayed setup screen of the third level (i.e., a screen title of the first level and a screen title of the second level) is displayed as the breadcrumbs 35b. In other words, the breadcrumbs 35b includes the title strings corresponding to all screen which are positioned in a part of the screen navigation path from the menu screen to a current screen that is displayed on the selection display area 32, the all screen excluding the current screen. In the breadcrumbs 35b, the screen title is arranged in descending order of hierarchical level. Based on the breadcrumbs 35b, the user can determine the screen navigation path leading up to the current screen.

The MFP 1 also adds a triangular shaped separating character 35c to the head of each screen title in the breadcrumbs 35b for separating the screen titles. Based on the separating characters 35c, the user can identify each screen title in the breadcrumbs 35b. The MFP 1 also includes a number in each separating character 35c for indicating the hierarchical level of the setup screen corresponding to each screen title. Hence, the user can recognize the hierarchical level of the setup screen corresponding to each screen title in the currently displayed breadcrumbs 35b. Further, since the number indicating the hierarchical level is displayed within each separating character 35c, the MFP 1 can display useful information to the user for helping the user understand the hierarchical level of the currently displayed setup screen while preventing a large increase in the number of characters constituting the breadcrumbs 35b.

The return button area 36 serves as a button that shifts the display in the selection display area 32 back to the screen belonging to the next higher level (preceding level). The return button area 36 is grayed out when displaying the screen belonging to the topmost level in the screen management table 12b.

When the user performs an operation to touch one of the selections 33 in the LCD panel of the LCD 27 displaying a setup screen, the MFP 1 changes the display to a setup screen belonging to the next lower hierarchical level that corresponds to the selection. The operation to touch a selection 33 is equivalent to a "prescribed selection operation," where the prescribed selection operation may comprise operations to select and accept a selection 33 using the operating keys 26.

For example, if the user selects the selection 33 having the text "OGM" in the third level setup screen shown in the top image of FIG. 3, the MFP 1 changes the display in the selection display area 32 to the fourth level setup screen having the screen title "OGM," which is used for setting an outgoing message. This fourth level setup screen includes selections 33 having screen titles for fifth level setup screens hierarchically one level below the current setup screen. The MFP 1 creates new breadcrumbs 35b each time the displayed screen is changed and displays the new breadcrumbs 35b in the breadcrumbs display area 34b. Therefore, the user can confirm the latest screen navigation history from the breadcrumbs 35b each time the displayed setup screen is updated.

When the user selects one of the selection 33 in the currently displayed fourth setup screen, the MFP 1 changes the display on the LCD 27 to a fifth level setup screen corresponding to the selection. Since the fifth level is the lowest hierarchical level in this example, the character string depicted in each selection 33 in the fifth level setup screen represents a value for the MFP 1 to assign to a setting item or a process for the MFP 1 to execute. If the user selects one of the selections 33, the MFP 1 sets the relevant setting item to the value associated with the selection 33 or executes the process associated with the selection 33.

When displaying the fifth level setup screen, the MFP 1 generates a character string that includes all screen titles from the first level to the fourth level as the breadcrumbs 35b. However, in some cases the length of the breadcrumbs from beginning to end is too long to fit within the breadcrumbs display area 34b. In other words, the breadcrumbs 35b is too large to be displayed entirely on the breadcrumbs display area 34b.

If the breadcrumbs 35b do not fit within the breadcrumbs display area 34b, the MFP 1 according to the first embodiment automatically scrolls the breadcrumbs 35b toward the right. Moreover, the MFP 1 automatically begins scrolling the breadcrumbs 35b without waiting for an instruction from the user to begin scrolling.

By scrolling the breadcrumbs 35b in a longitudinal direction in this way, the MFP 1 enables the user to view the screen titles for all levels above that of the currently displayed setup screen, even when the breadcrumbs display area 34b is too small to display the breadcrumbs 35b at one time. As a result, the user can easily identify where the currently displayed setup screen belongs in the hierarchy.

Further, since a separating character 35c including a level number is added to each screen title in the breadcrumbs 35b, the user can readily identify the hierarchical level for each screen title in the breadcrumbs 35b. In cases that the screen titles continue to run beyond the breadcrumbs display area 34b, the user is able to deduce the existence of hierarchical levels beyond the breadcrumbs display area 34b based on the number in the separating character 35c added to each displayed screen title. For example, if the level numbers "2" through "5" are visible in the breadcrumbs 35b, the user can recognize that the screen title for the first level falls outside the display area. If it is necessary to know the screen title for the first level, the user can simply wait until the first level screen title scrolls into the display area and becomes visible.

In addition, by adding a separating character 35c indicating a level number to the screen title 35a for the current setup screen displayed in the title display area 34a, the user can easily determine the hierarchical level of the currently displayed screen. Thus, even when some of the screen titles in the breadcrumbs 35b run outside the title display area 34a and hence do not appear in the display, the user can deduce the hierarchical levels of screen titles that fall outside the breadcrumbs display area 34b based on the relationship between the numbers (level numbers) in separating characters 35c added to screen titles in the breadcrumbs 35b and the number in the separating character 35c added to the screen title 35a for the current setup screen. For example, if the user recognizes that the currently displayed setup screen belongs to the fifth level based on the number in the separating character 35c attached to the screen title 35a, but sees only level numbers "1" through "3" in the breadcrumbs 35b, the user can deduce that a screen title in the breadcrumbs 35b for the fourth level falls outside the display. If it is necessary to know this fourth level screen title, the user can simply wait until the screen title for the fourth level scrolls into the display area and becomes visible.

Figure 4:
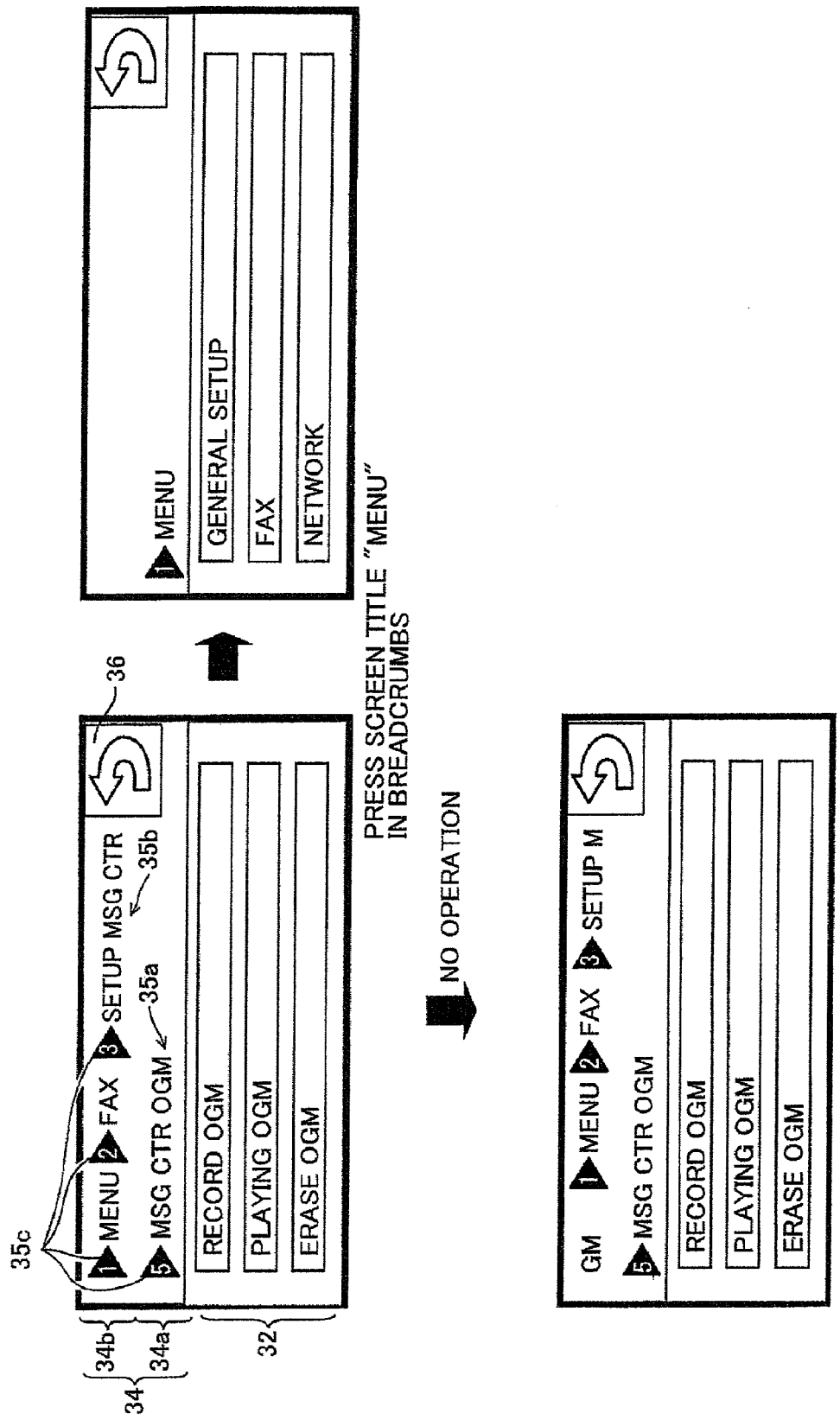
FIG. 4 is an explanatory diagram showing a transition of screen images displayed on the display unit when a navigation string is scrolled.

FIG. 4 shows an example of screen transitions when the user performs an operation and does not perform an operation while the breadcrumbs 35b are automatically scrolled. As shown in FIG. 4, the MFP 1 continues scrolling the breadcrumbs 35b while the user does not perform an operation. The breadcrumbs 35b are scrolled in a direction that shifts the characters rightward in FIG. 4 (i.e., a direction from the first character toward the last character). Thus, as the characters at the head of the breadcrumbs 35b shift rightward, characters at the end of the breadcrumbs 35b begin to appear in the left edge of the breadcrumbs display area 34b. Hence, the breadcrumbs 35b are circulated in the display. Therefore, even if the user has to leave the MFP 1 during a setup operation in the setup mode, the user can easily recall the point at which the setup operation was interrupted upon returning to the MFP 1 by viewing the breadcrumbs 35b circulating in the display.

When the user presses a screen title in the breadcrumbs 35b as the breadcrumbs 35b are being scrolled, the MFP 1 changes the display on the LCD 27 to a setup screen corresponding to the pressed screen title. In the example shown in FIG. 4, the user has pressed the screen title "Menu" in the breadcrumbs 35b, after which the MFP 1 changes the display on the LCD 27 to the menu screen.

Therefore, if the user wishes to select a specific screen title in the breadcrumbs 35b but the desired screen title is not displayed in the breadcrumbs display area 34b because the breadcrumbs 35b are too long to be displayed all at once, the user simply waits as the MFP 1 scrolls the breadcrumbs 35b until the desired screen title is displayed. Accordingly, the MFP 1 according to the preferred embodiment is user-friendly.

Figure 5:
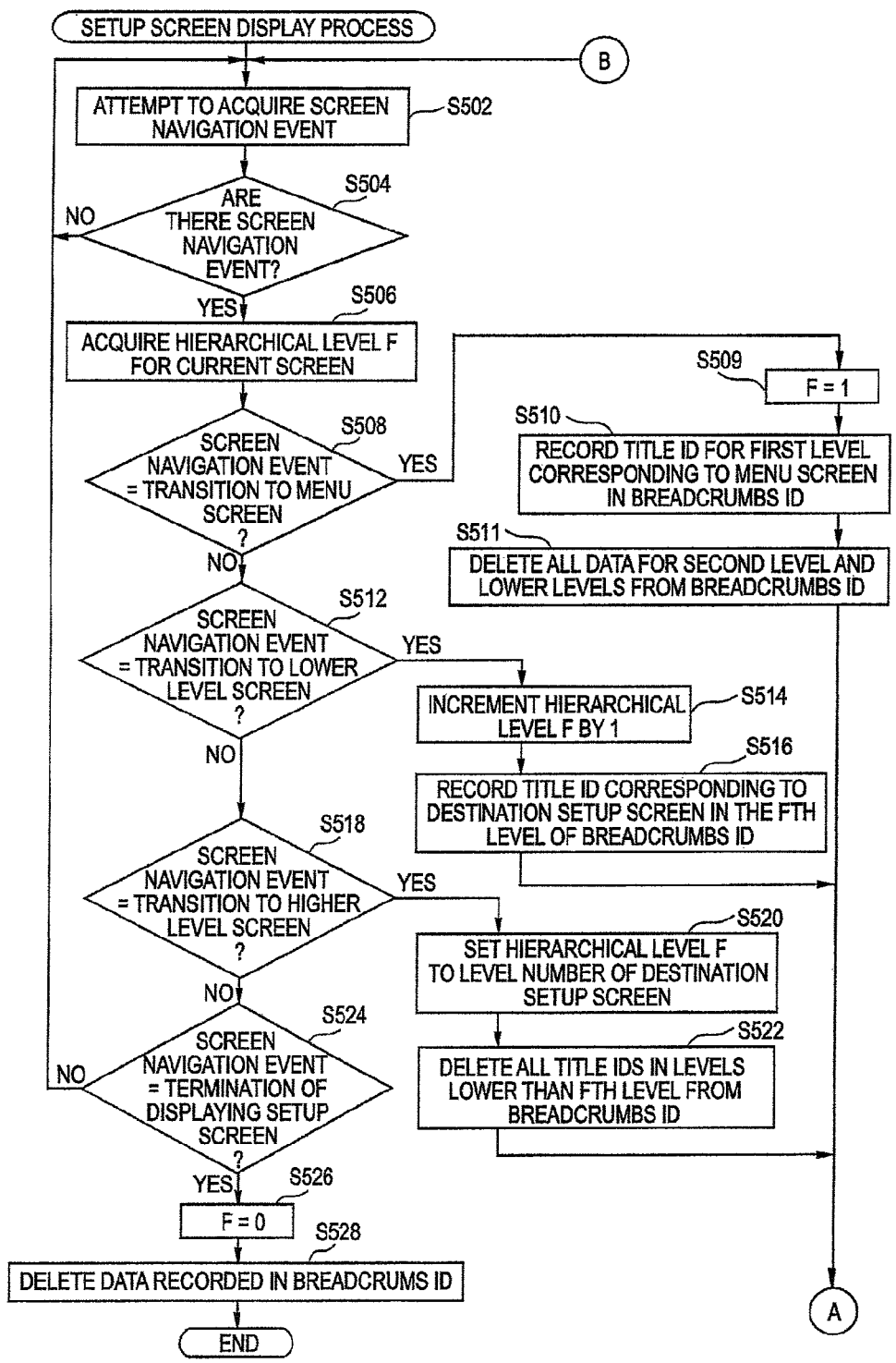
FIGS. 5 and 6 are flowcharts illustrating steps in a setup screen display process executed by the display device.
Figure 6:
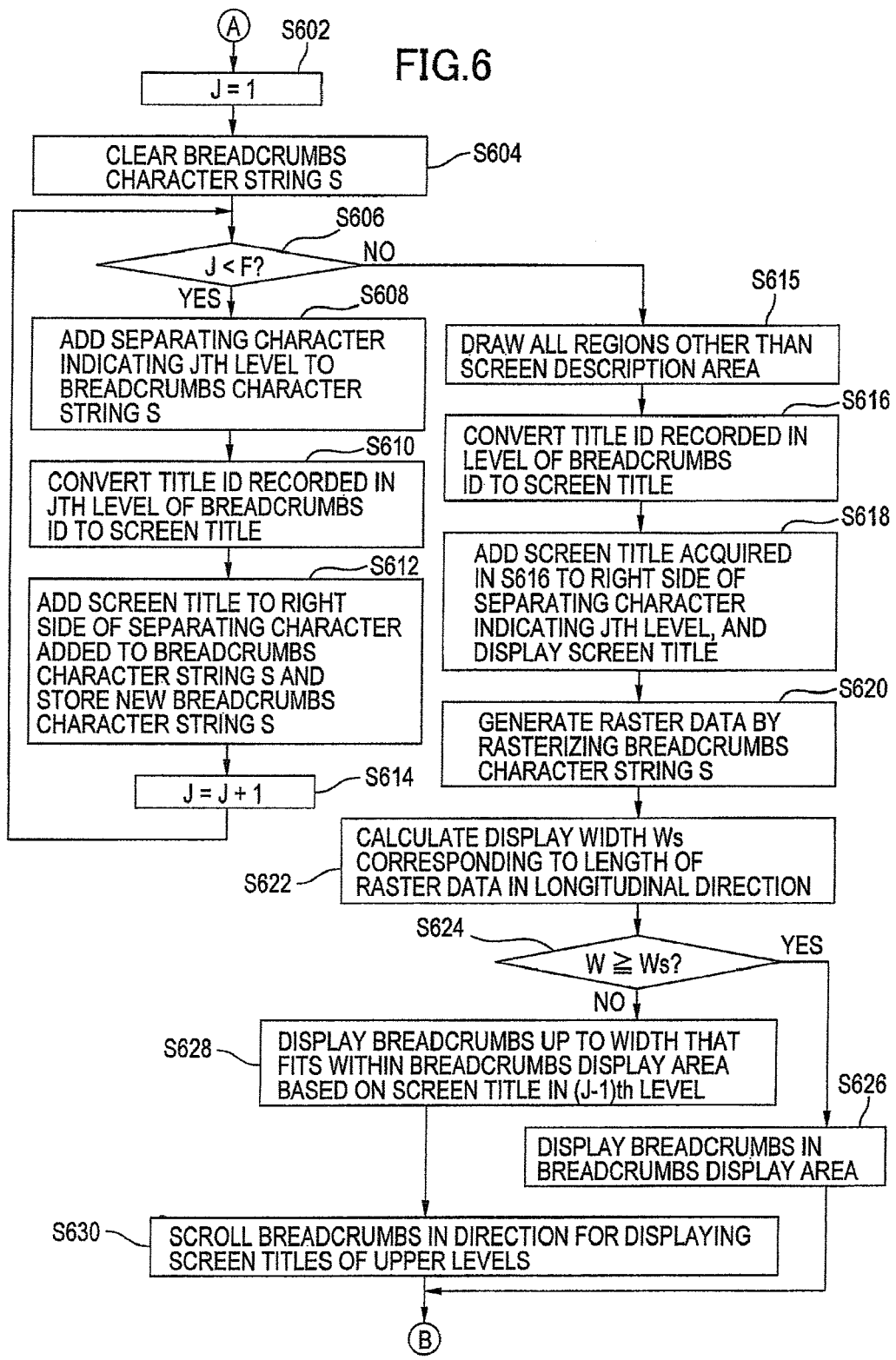

FIGS. 5 and 6 are flowcharts illustrating steps in a setup screen display process. The MFP 1 periodically executes the setup screen display process when in the setup mode. In S502 at the beginning of the setup screen display process, the CPU 11 attempts to acquire or checks for a screen navigation event. Specifically, the CPU 11 acquires screen navigation events when the touch panel 28 detects that the user operates one of the selections 33 displayed on the LCD 27, the screen title contained in the breadcrumbs 35b, or the Return button area 36. In S504 the CPU 11 determines whether there was a screen navigation event to acquire. If the CPU 11 determines that there was no screen navigation event (S504: NO), the CPU 11 repeats the process in S502.

However, if the CPU 11 determines in S504 that a screen navigation event was acquired (S504: YES), in S506 the CPU 11 acquires the hierarchical level f for the currently displayed screen. In S508 the CPU 11 determines whether or not the screen navigation event acquired in S502 indicates a transition to the menu screen. If the user indicated a desire to navigate to the menu screen (S508: YES), in S509 the CPU 11 sets the hierarchical level f to "1", in S510 records the title ID for the first level corresponding to the menu screen (see FIG. 2) in the breadcrumbs ID, in S511 deletes all data for the second level and lower levels from the breadcrumbs ID, and subsequently advances to S602 of FIG. 6. The breadcrumbs ID will be described later in greater detail.

However, if the CPU 11 determines in S508 that the screen navigation event does not correspond to a transition to the menu screen (S508: NO), in S512 the CPU 11 determines whether or not the screen navigation event indicates a transition to a lower level screen. For example, if the user chooses a selection 33 displayed in the selection display area 32 (S512: YES), in S514 the CPU 11 increments the hierarchical level f by "1", in S516 records the title ID corresponding to the destination setup screen in the $f^{th}$ level of the breadcrumbs ID, and subsequently advances to S602 of FIG. 6.

The breadcrumbs ID is a data array in which a single title ID may be recorded for each hierarchical level. The breadcrumbs ID is updated each time the displayed setup screen changes. For example, if the currently displayed setup screen is the TCP/IP setup screen positioned in the fourth level in the screen management table 12b, the screen navigation path from the menu screen to the current screen is indicated in the breadcrumbs as ">Menu>Network>Wired LAN." Note that the separating character 35c indicated by a triangular icon and numeral in FIGS. 3 and 4 is represented in this specification as the ">" symbol, and the number has been omitted. In the above example, the following data is saved as the breadcrumbs ID: [1]ID000[2]ID300[3]ID301[4]ID304, where the numbers in "[ ]" correspond to the hierarchical levels and each character string starting with "ID" corresponds to the title ID recorded for the respective hierarchical level. In the subsequent process, the CPU 11 uses this breadcrumbs ID to create a breadcrumbs character string S.

On the other hand, if the event is not a transition to a lower level screen (S512: NO), in S518 the CPU 11 determines whether or not the screen navigation event indicates a transition to a higher level screen. For example, when the user operates the Return button area 36 or operates a screen title within the breadcrumbs 35b (S518: YES), in S520 the CPU 11 sets the hierarchical level f to the level number of the destination setup screen, in S522 deletes all title IDs in levels lower than the $f^{th}$ level from the breadcrumbs ID, and subsequently advances to S602 of FIG. 6.

However, if the event does not indicate a transition to an upper level screen (S518: NO), in S524 the CPU 11 determines whether or not the screen navigation event indicates an instruction to end the setup screen display process. For example, when the user inputs an instruction to switch from the setup mode to another mode (S524: YES), in S526 the CPU 11 resets the hierarchical level f to "0", in S528 deletes the data recorded in the breadcrumbs ID, and subsequently ends the setup screen display process. However, if the CPU 11 determines that the screen navigation event does not indicate an instruction to end the setup screen display process (S524: NO), the CPU 11 returns to S502 and repeats the above process.

The continuation of the setup screen display process will be described with reference to FIG. 6. In S602 the CPU 11 sets a variable J representing a level number to "1". In S604 the CPU 11 clears the breadcrumbs character string S. The breadcrumbs character string S is data representing the breadcrumbs 35b displayed in the breadcrumbs display area 34b as character codes.

In S606 the CPU 11 determines whether the variable J is smaller than the hierarchical level f. If J is smaller than f (S606: YES), in S608 the CPU 11 adds a separating character 35c indicating the $J^{th}$ level to the breadcrumbs character string S. In the first embodiment, a separating character 35c indicating the $J^{th}$ level is a triangular icon in which the level number J is included as shown in FIG. 4.

In S610 the CPU 11 converts the title ID recorded in the $J^{th}$ level of the breadcrumbs ID to a screen title by extracting the screen title from the screen management table 12b that is associated with the title ID recorded in the Jth level of the breadcrumbs ID. In S612 the CPU 11 creates a new breadcrumbs character string S by adding the above screen title to the right side (end) of the separating character added to the breadcrumbs character string S in S608 and stores the new breadcrumbs character string S in the RAM 14. In S614 the CPU 11 increments the variable J by "1" and returns to S606.

The CPU 11 creates the breadcrumbs character string S by repeatedly performing the above process. Specifically, the CPU 11 creates the breadcrumbs character string S by adding, to each screen title corresponding to all screen images which are positioned in a part of the screen navigation path from the menu screen image to a current screen that is displayed on the selection display area 32 currently. When the CPU 11 determines in S606 that J is greater than or equal to f while repeating the above process (S606: NO), in S615 the CPU 11 draws all regions other than the screen description area 34, i.e., the selection display area 32 and Return button area 36. In other words, in S615 the CPU 11 changes a screen to display from the screen displayed currently to another screen based on the screen navigation event.

In S616 the CPU 11 converts the title ID recorded in the $J^{th}$ level of the breadcrumbs ID to a screen by extracting the screen title from the screen management table 12b that is associated with the title ID recorded in the Jth level of the breadcrumbs ID. In S618 the CPU 11 adds the screen title acquired in S616 to the right side of the separating character 35c indicating the $J^{th}$ level to form the screen title 35a, and displays this screen title 35a in the title display area 34a. In the other words, the CPU 11 creates screen title 35a by adding, to the screen title corresponding to the screen displayed currently, the separating character 35c including hierarchical number indicating the hierarchical level of the current displayed screen.

In S620 the CPU 11 rasterizes the breadcrumbs character string S created above to generate raster data. In S622 the CPU 11 calculates a display width Ws corresponding to the length of the raster data in the longitudinal direction. Since the breadcrumbs character string S is rasterized before being displayed as breadcrumbs 35b in a subsequent process, the CPU 11 can acquire the length of the breadcrumbs 35b (i.e., the horizontal dimension of the character array) based on how the breadcrumbs 35b will actually be displayed in the breadcrumbs display area 34b by finding the length (display width Ws) of the rasterized breadcrumbs.

Figure 7:
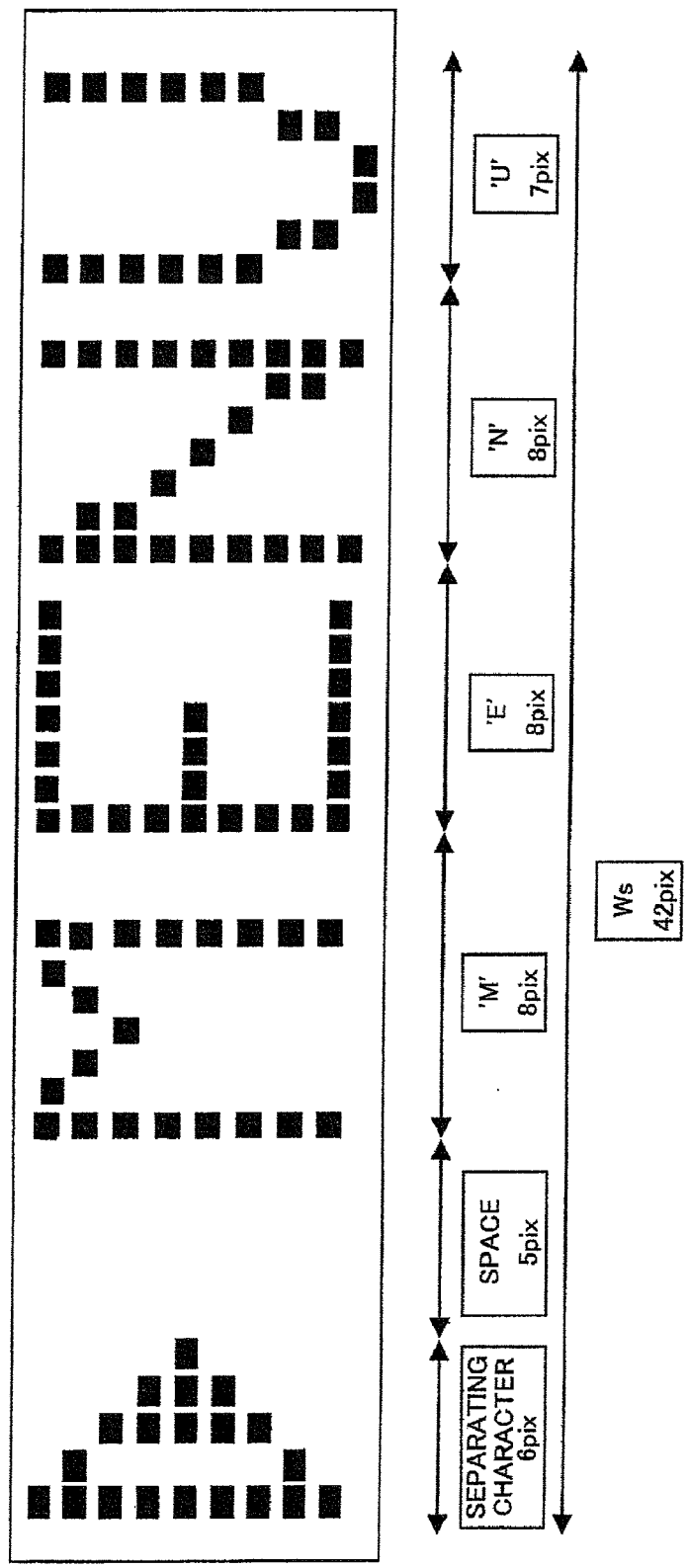
FIG. 7 is an enlarged view of a rasterized concatenated string.

FIG. 7 is an enlarged view of a breadcrumbs character string S that has been rasterized. Through the rasterization process, the CPU 11 develops the breadcrumbs character string S represented by character codes into a bitmap image represented by an array of points (pixels). In the first embodiment, the CPU 11 totals the number of pixels in the width direction required to display each character and space in order to calculate the display width Ws corresponding to the longitudinal length of the concatenated string.

Further, during rasterization the CPU 11 reads settings from the EEPROM 15 for the size and font of the text to be displayed in the breadcrumbs display area 34b and develops a bitmap image corresponding to this text size and font. For example, the user may be allowed to select from among large, medium, and small text sizes for the text to be displayed in the LCD 27. The MFP 1 may also allow the user to select a desired font for the text to be displayed in the LCD panel. For some fonts, the width of each character may differ. With a proportional font, for example, the letter "U" shown in FIG. 7 has a width of seven pixels, while the letters "M", "E", and "N" have respective widths of eight pixels. Further, in many cases the width of roman characters differs from the width of Chinese characters (kanji). Hence, the CPU 11 can acquire a more accurate display width Ws through a calculation based on the rasterized bitmap image than through a calculation simply based on the number of characters.

Returning to FIG. 6, in S624 the CPU 11 determines whether or not the entire breadcrumbs character string S can be displayed inside the breadcrumbs display area 34b as a breadcrumbs 35b. That is, the CPU 11 determines whether or not the display width Ws is less than or equal to a predetermined width W, where the predetermined width W is a value equivalent to the number of pixels in the breadcrumbs display area 34b along the horizontal direction (longitudinal direction) thereof that can be used for displaying text. In other words, The CPU 11 determines whether or not the breadcrumbs character string S is too large to be displayed entirely.

When the CPU 11 determines that the display width Ws is less than or equal to a predetermined width W, i.e., that the breadcrumbs 35b is small enough to be displayed entirely and can fit within the breadcrumbs display area 34b (S624: YES), in S626 the CPU 11 displays the breadcrumbs 35b in the breadcrumbs display area 34b from beginning to end based on the breadcrumbs character string S. In this case, the display position of the breadcrumbs 35b is fixed and the CPU 11 does not automatically scroll the breadcrumbs 35b.

However, if the CPU 11 determines that the display width Ws is greater than the predetermined width W (S624: NO), i.e., that the entire breadcrumbs 35b is too large to be displayed entirely and cannot fit within the breadcrumbs display area 34b, in S628 the CPU 11 displays the breadcrumbs 35b up to a width that fits within the breadcrumbs display area 34b, based on the screen title in the lowermost level, so that the last character in the screen title of the lowermost level ($(J-1)^{th}$ level) in the breadcrumbs character string S is positioned in the right end of the breadcrumbs display area 34b. In other words, the CPU 11 displays a part of the breadcrumbs 35b by omitting to display either a top one of the screen titles located at a top of the breadcrumbs character string S or a plurality of screen titles including and continuous from the top one of the breadcrumbs character string S. Therefore, the breadcrumbs 35b are displayed after omitting the screen title corresponding to the first level, or screen titles corresponding to setup screens in a plurality of upper levels including and continuous from the first level.

In S630 the CPU 11 begins and continues scrolling the breadcrumbs 35b rightward automatically so as to display the screen title in ascending order of hierarchical level. Specifically, as described with reference to FIG. 3, the CPU 11 scrolls the breadcrumbs 35*b* in a direction for displaying the screen titles of upper levels that were initially omitted from the display. In other words, the CPU 11 scrolls the breadcrumbs 35*b* on the breadcrumbs display area 34*b* in a direction to display the omitted screen title. That is, the CPU 11 scrolls the breadcrumbs 35*b* so that each character contained in the breadcrumbs 35*b* moves in a direction from a head character to an end character of the breadcrumbs 35*b*. Subsequently, the CPU 11 returns to S502 of FIG. 5.

In this way, the MFP 1 can present screen titles to the user with priority given to levels nearest the level of the currently displayed setup screen. Further, even when the user cannot see required information when the breadcrumbs 35*b* are first displayed because screen titles of upper levels are not initially included in the display, the user can simply wait while the breadcrumbs 35*b* are scrolled rightward until the omitted screen titles come into view on the display. Thus, by watching the displayed data scrolled automatically in the breadcrumbs display area 34*b*, the user can acquire the necessary information.

Further, the MFP 1 shows screen titles to the user in order from the screen titles nearest the hierarchical level of the currently displayed setup screen. Thus, the user can more quickly recognize useful information for understanding the hierarchical position of the currently displayed setup screen.

Next, a second embodiment of the present invention will be described with reference to FIGS. 8 and 9. While the MFP 1 according to the first embodiment automatically scrolls the breadcrumbs 35*b* as described above, the MFP 1 according to the second embodiment only scrolls the breadcrumbs 35*b* when the user inputs an instruction to perform a scrolling operation.

The MFP 1 according to the second embodiment has the same appearance and electrical structure as the MFP 1 according to the first embodiment. Therefore, like parts and components are designated with the same reference numerals to avoid duplicating description. The same step numbers are used in the second embodiment for identical steps described in the first embodiment. The following description will focus on the differences from the first embodiment.

Figure 8:
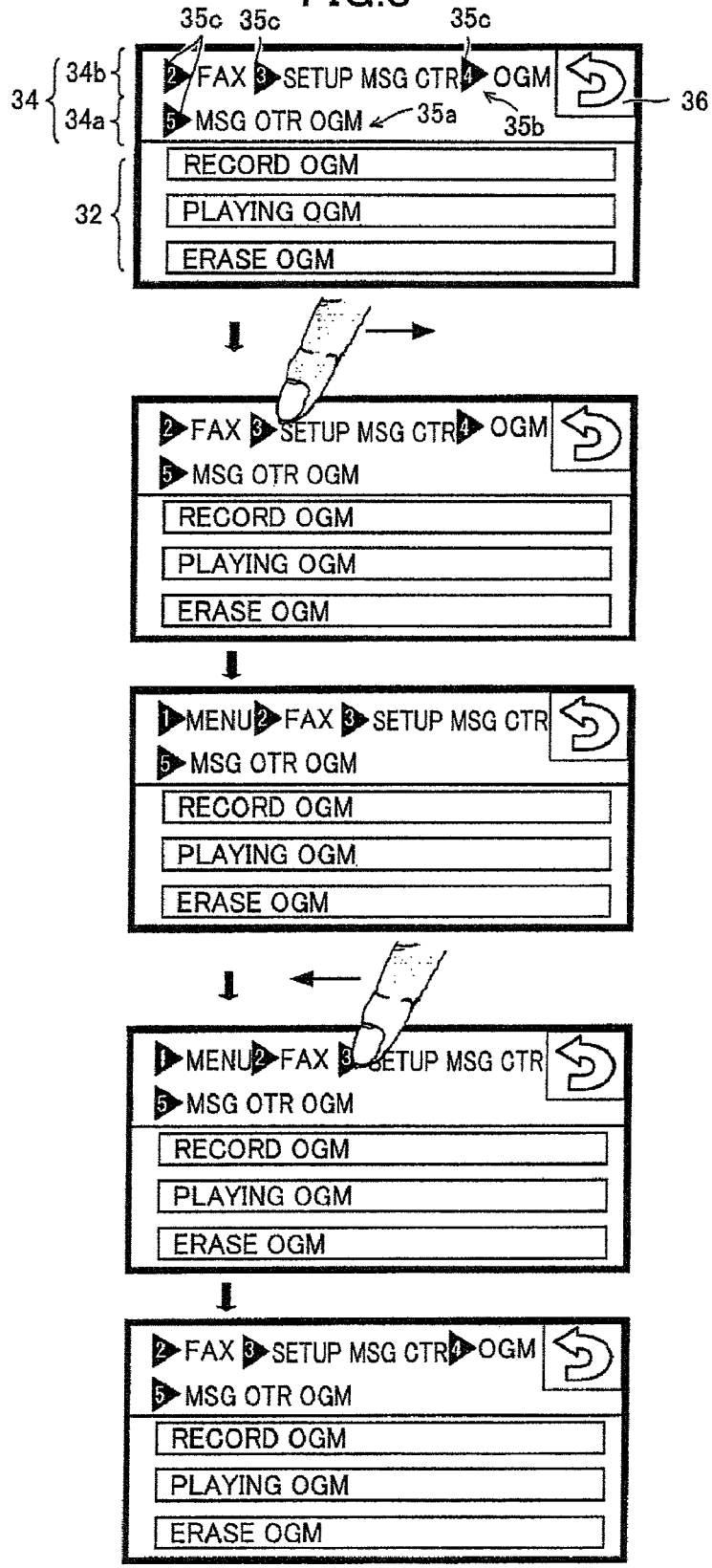
FIG. 8 is an explanatory diagram showing a transition of screen images displayed on a display unit provided on a display device according to a second embodiment when a user scrolls the navigation string.

The top screen in FIG. 8 shows an example of a fifth level setup screen displayed in the selection display area 32. The breadcrumbs 35*b* in this example are a character string created by concatenating screen titles for levels 1 through 4. However, since the entire breadcrumbs 35*b* cannot fit within the breadcrumbs display area 34*b*, the screen title for the topmost level (first level) is omitted from the display.

At this time, the user can perform an operation to slide the breadcrumbs 35*b* by touching the breadcrumbs 35*b* in the breadcrumbs display area 34*b* with a finger or other indicator and sliding the indicator rightward, for example. When the touch panel 28 detects this operation, the MFP 1 scrolls (slides) the breadcrumbs 35*b* in the direction of the operation. That is, the touch panel is configured to enable a user to designate a direction to scroll the breadcrumbs 35*b*.

For example, when the user performs an operation to touch the LCD panel within the breadcrumbs display area 34*b* with an indicator and to slide the indicator rightward, the MFP 1 scrolls the breadcrumbs 35*b* so that the characters constituting the breadcrumbs 35*b* slide rightward. Through this operation, the screen title for the top level, which the user wishes to view, becomes displayed in the breadcrumbs display area 34*b*, as shown in the third image from the top in FIG. 8, enabling the user to learn the screen title for the top level screen.

At the same time, the screen title for the fourth level in the breadcrumbs 35*b*, which is the lowest level slides beyond the display area, as shown in the third image of FIG. 8. However, as in the first embodiment described earlier, the MFP 1 according to the second embodiment attaches a separating character 35*c* indicating the level number to the screen title 35*a* displayed in the title display area 34*a*. In the example shown in FIG. 8, the user can recognize that the currently displayed setup screen belongs to the fifth level based on the separating character 35*c* attached to the screen title 35*a*. Therefore, the user can also recognize that the screen title for the fourth level in the breadcrumbs 35*b* is excluded from the display.

If the user subsequently performs an operation to touch the LCD panel in the breadcrumbs display area 34*b* with an indicator and to slide the indicator leftward, the MFP 1 scrolls the breadcrumbs 35*b* so that the characters in the breadcrumbs 35*b* slide leftward. Through this operation, the screen title for the lowest level in the breadcrumbs 35*b*, which was omitted from the display, is again displayed in the breadcrumbs display area 34*b*, as illustrated in the bottom image of FIG. 8, enabling the user to recognize the screen title for the lowest level.

As in the first embodiment described earlier, if the user touches a screen title in the breadcrumbs 35*b*, the MFP 1 according to the second embodiment may also be configured to change the displayed screen to the setup screen corresponding to the touched screen title. If the user is unable to find the desired screen title in the breadcrumbs 35*b*, the user can scroll the breadcrumbs 35*b* in the appropriate direction while referencing the level numbers included in the separating characters 35*c* in order to display the desired screen title and can subsequently specify the setup screen corresponding to this screen title as the destination by touching the screen title.

Figure 9:
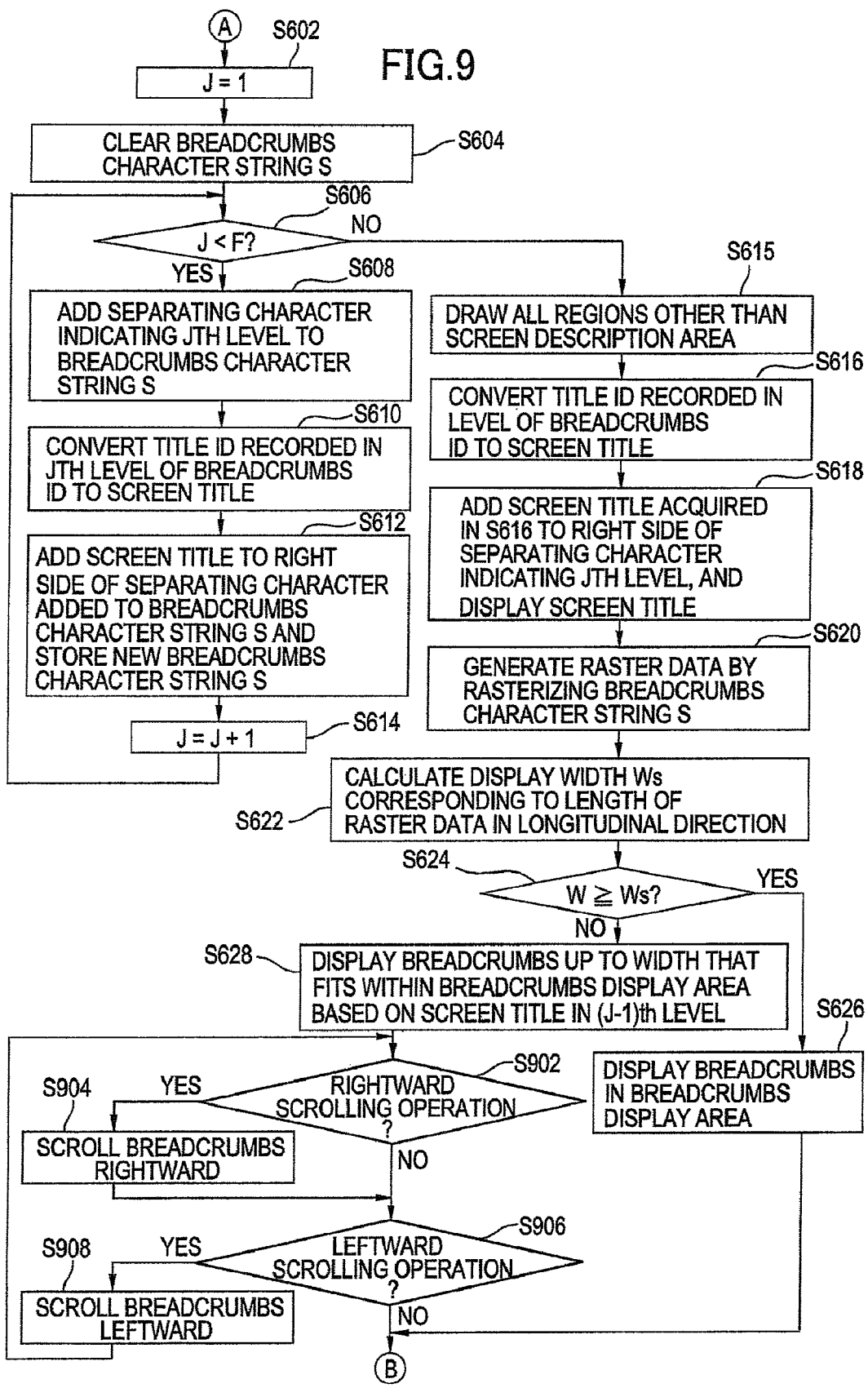
FIG. 9 is a flowchart illustrating steps in a part of the setup screen display process executed by the display device according to the second embodiment.

FIG. 9 is a flowchart illustrating steps in a setup screen display process executed on the MFP 1 according to the second embodiment. The setup screen display process according to the second embodiment differs from that described in the first embodiment (see FIGS. 5 and 6) in that S630 of the setup screen display process according to the first embodiment is replaced by S902 through S908. The remaining steps are identical to those in the setup screen display process according to the first embodiment and, therefore, a description of these steps will not be repeated.

In S902 the CPU 11 determines whether the user performed a rightward scrolling operation. In the second embodiment, the MFP 1 determines that the user performed a rightward scrolling operation when the touch panel 28 detects that the user touched the LCD panel in the breadcrumbs display area 34*b* and the touched position moved continuously rightward. However, the specific user operation for indicating a scrolling direction is not limited to the operation described above. For example, the operating keys 26 of the MFP 1 may include arrow keys or the like, and the MFP 1 may determine that the user has indicated a rightward scrolling operation when the user has pressed the right arrow.

If the CPU 11 determines that a rightward scrolling operation has been indicated (S902: YES), in S904 the CPU 11 scrolls the breadcrumbs 35*b* rightward. In other words, the CPU 11 scrolls the breadcrumbs 35*b* so that the characters constituting the breadcrumbs 35*b* flow to the right.

However, if a rightward scrolling operation was not performed (S902: NO), in S906 the CPU 11 determines whether the user has performed a leftward scrolling operation. If the CPU 11 determines that a leftward scrolling operation was performed (S906: YES), in S908 the CPU 11 scrolls the breadcrumbs 35b leftward. In other words, the CPU 11 scrolls the breadcrumbs 35b so that the characters constituting the breadcrumbs 35b flow to the left. However, if the CPU 11 determines that a leftward scrolling operation was not performed (S906: NO), the CPU 11 returns to S502 of FIG. 5.

With the MFP 1 according to the second embodiment, when a screen title included in the breadcrumbs 35b falls outside the display area, the user can bring the screen title onto the display by scrolling the breadcrumbs 35b in the appropriate direction. Further, since separating characters 35c indicating level numbers are added to the breadcrumbs 35b and the screen title 35a, the user can easily determine in which direction the breadcrumbs 35b must be scrolled in order to view a screen title currently outside the display area.

In the setup screen display process according to the second embodiment described above (see FIG. 9), the CPU 11 returns to S502 of FIG. 5 upon determining that the user has performed neither a leftward nor a rightward scrolling operation (i.e., upon reaching a negative determination in both S902 and S906), and thereafter does not accept instructions to scroll the breadcrumbs 35b. However, the setup screen display process may be modified so that the CPU 11 always scrolls the breadcrumbs 35b whenever the user inputs an instruction to scroll the breadcrumbs 35b.

While the invention has been described in detail with reference to the embodiments thereof, it would be apparent to those skilled in the art that various changes and modifications may be made therein without departing from the spirit of the invention.

For example, while the breadcrumbs are displayed in one line in the first and second embodiment described above, the breadcrumbs may be displayed in multiple lines with line breaks therebetween. In this case, the predetermined width W compared with the display width Ws would be a value found by multiplying the horizontal width of the breadcrumbs display area 34b by the number of lines available for displaying the breadcrumbs.

In the first and second embodiment described above, the MFP 1 determines whether the breadcrumb character string 35b fits within the breadcrumbs display area 34b based on the display width Ws expressing the horizontal length of the concatenated string after rasterization. However, the MFP 1 may be configured to determine whether or not the breadcrumb character string 35b fits within the breadcrumbs display area 34b based on the number of characters in the breadcrumb character string 35b.

In the first, second, and third embodiment described above, the screen title for the currently displayed screen is not included in the breadcrumbs. That is, the end of the breadcrumbs includes the screen title of the screen belonging to a level one hierarchical level above the currently displayed screen. However, the screen title for the currently displayed screen may also be included at the end of the breadcrumbs and displayed therewith. For example, when the screen "TCP/IP" is displayed currently in accordance with the screen management table 12b, the CPU 11 may display the concatenated string "MENU>NETWORK>LAN>TCP/IP" on the breadcrumbs display area 34b.

In the first, second, and third embodiment described above, the concatenated string includes the titles corresponding to all screen which are positioned in a part of the navigation path from menu screen to the current display screen. However, the concatenated string may include the titles each corresponding to a screen which is positioned at a part of the navigation path from the menu screen to the current display screen. For example, when the screen "TCP/IP" is displayed currently in accordance with the screen management table 12b, the CPU 11 may create the concatenated string "MENU>LAN>TCP/IP" excluding "NETWORK".

Further, the menu screen itself may be positioned in one of a plurality of screen navigation paths branching off a screen positioned one level higher. In other words, the menu screen may not have the highest hierarchical level and branches from the screen having the hierarchical level higher than the hierarchical level of the menu screen.

In the first, second, and third embodiment, the menu screen is used as a base screen image in order to create the concatenated string. However, other screen may be used as the base screen image. For example, the "Network" screen is used as the base screen image. In this case, the CPU 11 may create the concatenated string when the current image is positioned below the "Network" screen, and may not create the concatenated string when the current image is not positioned below the "Network" screen.

What is claimed is:

1. A display device comprising:
   a display unit including a first portion, a second portion, and a third portion that are different from one another;
   a first display control unit configured to display one of a plurality of screen images on the first portion, the plurality of screen images including a base screen image and being arranged hierarchically from the base screen image, the first display control unit changing a screen image to display from one to another of the plurality of screen images along a screen navigation path starting from the base screen image based on screen navigation data, the screen navigation data indicating relationships between the screen images, each screen image having a hierarchical level indicating where the screen image is positioned;
   a title string storing unit configured to store a plurality of title strings, each title string indicating one of the plurality of screen images;
   a navigation string creating unit configured to create a navigation string including title strings each corresponding to a screen image which is positioned in a part of the screen navigation path from the base screen image to a current screen image that is displayed on the first portion currently, the navigation string excluding a title string of the current screen image, the navigation string further including hierarchical numbers each corresponding to one of the title strings included in the navigation string, each hierarchical number indicating a hierarchical level of one of the screen images which is positioned in the part of the screen navigation path, each hierarchical number being disposed between the corresponding title string and a title string adjacent to the corresponding title string;
   a second display control unit that is configured to display the navigation string on the second portion;
   a current string creating unit configured to create a current string by adding a hierarchical number indicating the hierarchical level of the current screen image to the title string corresponding to the current screen image;
   a third display control unit configured to display the current string on the third portion; and
   a scrolling unit configured to scroll the navigation string on the second portion in a longitudinal direction of the navigation string so that a part of the navigation string is displayed on the second portion at a time.

2. The display device according to claim 1,
   wherein the title strings included in the navigation string are arranged in descending order of hierarchical level.

3. The display device according to claim 2, wherein the scrolling unit is configured to automatically continue scrolling the navigation string so as to display the title string in ascending order of hierarchical level.

4. The display device according to claim 1, wherein the scrolling unit is configured to scroll the navigation string when the navigation string is too large to be displayed entirely on the second portion.

5. The display device according to claim 4, further comprising a determining unit that is configured to determine whether or not the navigation string is too large to be displayed entirely on the second portion,
wherein the navigation string creating unit is configured to create the navigation string each time the first display control unit changes a screen image to display from one to another of the plurality of screen images,
wherein, when the navigation string is too large to be displayed entirely on the second portion, the second display control unit displays, on the second portion, a part of the navigation string by omitting to display either a top one of the title strings located at a top of the navigation string or a plurality of title strings including and continuous from the top one of the title strings, and
wherein the scrolling unit scrolls the navigation string on the second portion in a direction to display the omitted title strings.

6. The display device according to claim 5, further comprising:
a rasterizing unit configured to rasterize the navigation string; and
a calculating unit configured to calculate a display width corresponding to a length of the rasterized navigation string in the longitudinal direction, and
wherein the determining unit is configured to determine that the navigation string is small enough to be displayed entirely on the second portion when the display width is smaller than or equal to a predetermined width.

7. The display device according to claim 1, wherein the scrolling unit is configured to scroll the navigation string so that each character contained in the navigation string moves in a direction from a head character to an end character of the navigation string.

8. The display device according to claim 1, further comprising a designating unit that is configured to enable a user to designate a direction to scroll the navigation string,
wherein the scrolling unit scrolls the navigation string in the direction designated by the user.

9. The display device according to claim 1, wherein when one of the title strings included in the navigation strings displayed on the second portion is specified, the first display control unit changes the screen image displayed on the first portion to display from the current screen image to a specified screen image corresponding to the title string that is specified;
wherein when the one of the title strings included in the navigation strings displayed in the second portion is specified, the navigation string creating unit updates the navigation string to an updated navigation string including title strings each corresponding to a screen image which is positioned in a part of the screen navigation path from the base screen image to the specified screen image;
wherein the second display control unit displays the updated navigation string on the second portion when the navigation string creating unit updates the navigation string;
wherein when the one of the title strings included in the navigation strings displayed on the second portion is specified, the current string creating unit updates the current string to the specified title string;
wherein the third display control unit displays the specified title string as the current string on the third portion, when the current string creating unit updates the current string top the specified title string.

10. A method comprising:
displaying one of a plurality of screen images on a first portion of a display unit, the plurality of screen images including a base screen image and being arranged hierarchically from the base screen image, the display unit including the first portion, a second portion, and a third portion that are different from one another;
changing a screen image to display from one to another of the plurality of screen images along a screen navigation path starting from the base screen image based on screen navigation data, the screen navigation data indicating relationships between the screen images, each screen image having a hierarchical level indicating where the screen image is positioned;
creating a navigation string including title strings each corresponding to a screen image which is positioned in a part of the screen navigation path from the base screen image to a current screen image that is displayed on the first portion currently, the navigation string excluding a title string of the current screen image, the navigation string further including hierarchical numbers each corresponding to one of the title strings included in the navigation string, each hierarchical number indicating a hierarchical level of one of the screen images which is positioned in the part of the screen navigation path, each hierarchical number being disposed between the corresponding title string and a title string adjacent to the corresponding title string, each title string indicating one of the plurality of screen images;
displaying the navigation string on the second portion;
creating a current string by adding a hierarchical number indicating the hierarchical level of the current screen image to the title string corresponding to the current screen image;
displaying the current string on the third portion; and
scrolling the navigation string on the second portion in a longitudinal direction of the navigation string so that a part of the navigation string is displayed on the second portion at a time.

11. A non-transitory computer-readable recording medium that stores a data processing program, the data processing program comprising instructions for:
displaying one of a plurality of screen images on a first portion of a display unit, the plurality of screen images including a base screen image and being arranged hierarchically from the base screen image, the display unit including the first portion, a second portion and a third portion that are different from one another;
changing a screen image to display from one to another of the plurality of screen images along a screen navigation path starting from the base screen image based on screen navigation data, the screen navigation data indicating relationships between the screen images, each screen image having a hierarchical level indicating where the screen image is positioned;
creating a navigation string including title strings each corresponding to a screen image which is positioned in a part of the screen navigation path from the base screen image to a current screen image that is displayed on the first portion currently, the navigation string excluding a title string of the current screen image, the navigation string further including hierarchical numbers each corresponding to one of the title strings included in the navigation string, each hierarchical number indicating a hierarchical level of one of the screen images which is positioned in the part of the screen navigation path, each hierarchical number being disposed between the corresponding title string and a title string adjacent to the corresponding title string, each title string indicating one of the plurality of screen images;

displaying the navigation string on the second portion;

creating a current string by adding a hierarchical number indicating the hierarchical level of the current screen image to the title string corresponding to the current screen image;

displaying the current string on the third portion; and scrolling the navigation string on the second portion in a longitudinal direction of the navigation string so that a part of the navigation string is displayed on the second portion at a time.

* * * * *